Figure 1:
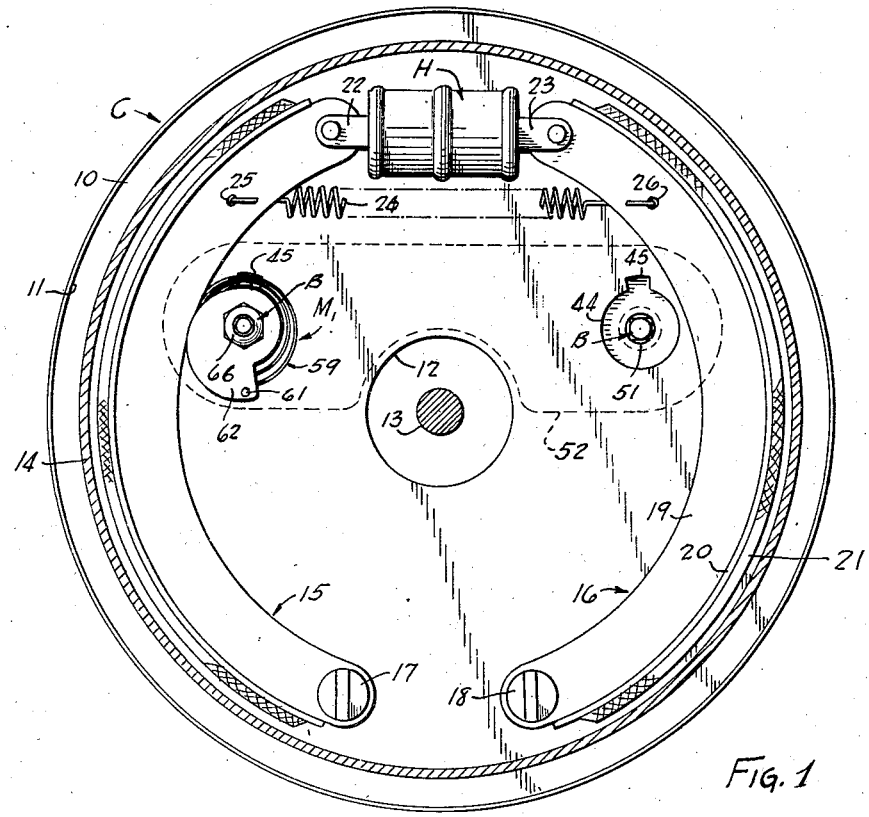

April 1, 1941.  A. E. LUDWIG  2,236,776

BRAKE

Filed April 25, 1940

INVENTOR.
ARNOLD E. LUDWIG.
BY Joshua R H Potts
ATTORNEY.

Patented Apr. 1, 1941

2,236,776

UNITED STATES PATENT OFFICE 2,236,776

BRAKE

Arnold Edward Ludwig, Asbury Park, N. J.

Application April 25, 1940, Serial No. 331,524

4 Claims. (Cl. 188—79.5)

This invention relates to brakes and is concerned primarily with mechanism for controlling retraction of a movable brake element into brake released position.

The present invention, in its original concept, is intended for use in conjunction with the modern automobile brake. Such a brake ordinarily includes a casing or supporting structure, two braking elements, one of which is movable relative to the other, a lining carried by one of the braking elements and adapted to engage the other, brake applying means for moving said movable braking element to urge the lining on one element into engagement with the other, and means for retracting the movable element into brake released position.

It is evident that with continued use of the brake the lining wears down. As a result it has been necessary to move the movable braking element a progressively greater distance for each application of the brakes. In view of this condition there has been a development providing mechanism for controlling retraction of the movable braking element into brake released position, whereby the clearance between the surface of the brake lining and the element with which it engages when the brakes are applied, is maintained substantially uniform and constant in brake released position. The development referred to has resulted in the copending applications of Arnold E. Ludwig, Serial Nos. 329,158, and 329,159, filed on April 11, 1940, respectively, and Serial Nos. 330,283 and 330,284, filed on April 18, 1940.

In certain of the retraction controlling means above identified a follower is associated with the movable braking element. An important object of the present invention is to provide instrumentalities which are associated with said follower, and which include and are actuated by a torsion spring for maintaining the follower in effective engagement with the movable braking element.

Another important object of the invention is the provision of retraction controlling mechanism of the character above noted in which the instrumentalities, including the torsion spring, are mounted on the casing or supporting structure by a device providing a certain predetermined amount of movement between said instrumentalities and said casing. It is this amount of movement which determines the clearance of brake released position.

More in detail this invention has, as an object, the provision of a brake including a casing together with a movable shoe. A cam is associated with the shoe, and a torsion spring is operatively associated with said cam for maintaining the latter in engagement with the shoe. The cam and torsion spring assembly are mounted on the casing through the medium of a device permitting a certain predetermined amount of rotation of the assembly as an entirety with respect to the casing.

Various other more detailed objects and advantages of the invention such as arise in carrying out the above noted objectives in practical embodiments will in part become apparent, and in part be hereinafter stated, as the description of the invention proceeds.

The invention, therefore, comprises mechanism for controlling retraction of a movable braking element into brake released position, and which mechanism is essentially characterized as including a follower which is associated with the movable braking element. Certain instrumentalities are associated with this follower for maintaining an effective engagement thereof with the movable braking element, and these instrumentalities include a torsion spring for maintaining the engagement. The follower and associated instrumentalities are mounted as an entirety on a casing of the brake by a device permitting a certain predetermined amount of movement between said assembly and said casing.

Figure 3:
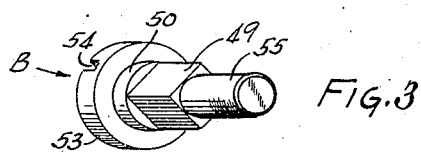
Figure 2:
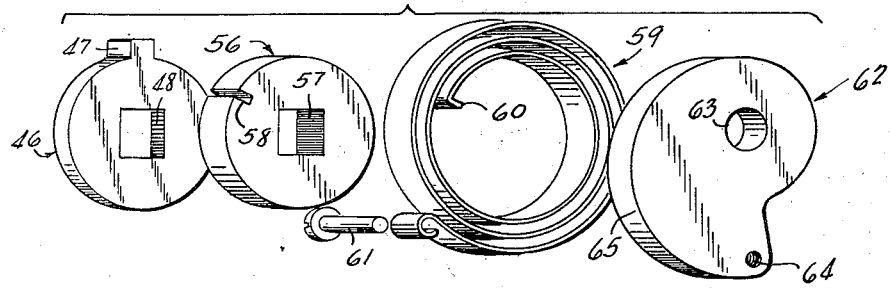

For a full and more complete understanding of the invention reference may be had to the following description and accompanying drawing, wherein Figure 1 is a side view, partly in section and partly in elevation, of a brake including mechanisms for controlling retraction of the brake shoes into brake released position, Figure 2 is a perspective view developing several parts of the retraction controlling mechanism of Figure 1 in exploded relation, and Figure 3 is another detailed perspective of one of the parts of this mechanism.

Referring now to the drawing, wherein like reference characters denote corresponding parts, and first more particularly to Figure 1, it will be noted that a brake which is exemplary of one to which the present invention may be applied is shown as comprising a casing referred to in its entirety by the reference character C. The casing C includes a disk-like plate 10 which carries, on its periphery, a flange 11 that houses the various means, mechanisms and devices included within the casing. The plate 10 is formed with the usual central opening 12, through which passes an automobile axle 13. A brake drum is shown at 14, and it is the inner surface of the drum 14 which is the effective braking surface.

A pair of brake shoes are referred to in their entirety by the reference characters 15 and 16, and these shoes are pivotally mounted on the plate 10 at 17 and 18, respectively. Each of the shoes 15 and 16 comprises a main web or rib 19 which carries an arcuate flange 20 that in turn carries a brake lining shown at 21. A hydraulic cylinder unit is identified at H, and a piston thereof (not illustrated) is shown as connected to the shoe 15 by a link 22.

Another piston (also not illustrated) of the hydraulic unit H is connected to the shoe 16, as by a link shown at 23. It is evident that the hydraulic unit H may be operated to urge the shoes outwardly to cause the linings 21 to engage the inner surface of the drum 14. A tension spring 24 has one end anchored at 25 to the shoe 15, and its other end anchored, as shown at 26, to the shoe 16. This spring 24 retracts the shoes 15 and 16 when the brakes are released.

In order to control this retraction of the shoes 15 and 16 so that the clearance between the surfaces of the linings 21 and drum 14 may be maintained substantially constant, the mechanisms shown at M1 are employed. It is evident from Figure 1 that there is a mechanism M1 associated with each of the shoes. Inasmuch as these mechanisms M1 are substantially alike in their construction it is deemed necessary to describe here in detail only the construction of one such mechanism.

It will be noted that the plate 10 of the casing C is formed with a pair of openings 44 adjacent to each of the shoes, and each of these openings 44 includes a recess shown at 45 for a purpose to be hereinafter pointed out.

A retraction controlling member is shown at 46 as being of circular formation except for the presence of an ear 47. The member 46, with its ear 47, is complemental to the opening 44 and recess 45, and the member 46 is received in this opening 44 with the ear 47 projecting into the recess 45. It is important to note that the recess 45 has a greater arcuate extent than the ear 47, so that a certain amount of rotation on the part of the member 46 with respect to the plate 10 is provided.

The member 46 is formed with a central opening 48 which is preferably noncircular in formation, being of the square shape illustrated, and this opening 48 receives a correspondingly shaped shank portion 49 formed on a bolt referred to in its entirety by the reference character B.

Adjacent the squared shank portion 49 the bolt B includes a cylindrical part 50 which is received in an opening 51 (Figure 1) formed in a retaining plate that is shown in dotted lines in Figure 1, and which is designated 52. This retaining plate 52 is secured to the rear face of the plate 10. The bolt B also carries a head 53 that engages the retaining plate 52, and this head may be provided with any appropriate means for turning the same, such as the slot shown at 54. The bolt B also includes a cylindrical shank portion 55 the purpose of which will be hereinafter pointed out.

A spring anchorage member is designated 56, and is shown as formed with a squared opening 57 that also receives the squared shank portion 49 of the bolt B. Thus the member 56 is non-rotatably mounted on the bolt B. This member 56 is formed on its outer periphery with a notch 58 in which is anchored one end of a torsion coil spring 59. This coil spring 57 has a flange at 60 that is received in the notch 58. The spring 59 is disposed about the member 56 and at its outer end is anchored to a pin 61.

A cam member 62 has an opening at 63 which receives the cylindrical shank portion 55 of the bolt B. This cam member 62 also is formed with an opening at 64 adjacent to its outer periphery, which receives the spring anchorage pin 61. It is also important to note that the cam member 62 is formed with a cam surface 65 which engages the respective brake shoe with which the mechanism M1 is associated.

As shown in Figure 1, the engagement of the surface 65 is preferably with the inner edge of the web 19. A nut, shown at 66, may be threaded on the extremity of the bolt B and serves to maintain the assembled relationship of the parts described.

When a hydraulic unit H is operated to apply the brakes, the shoes 15 and 16 move outwardly until the linings 21 engage the drum 14. During this outward movement the cam surfaces 65 of the cam 62 are maintained in engagement with the webs 19 of the respective shoes because of the tendency of the coil spring 59 to rotate the cam 62 in a clockwise direction, speaking with reference to the showing of the left-hand adjuster of Figure 1. When the brakes are released the retraction spring 24 is rendered effective to move the shoes inwardly. However, such inward movement can take place only over so far a distance as permitted by movement of the ear 47 in the recess 45. During such movement the entire assembly comprising bolt B, member 46, anchorage member 56, spring 59, and cam 62 rotate as an entirety.

While preferred specific embodiments of the invention are hereinbefore set forth it is to be clearly understood that the invention is not to be limited to the exact constructions illustrated and described, because various modifications of these details may be provided in putting the invention into practice within the purview of the appended claims.

I claim:

1. In a brake including a movable braking element and a casing formed with an opening adjacent to said movable braking element, mechanism for controlling retraction of said movable braking element into brake released position comprising a retraction controlling member rotatably mounted in said opening in the casing, limiting means providing a predetermined amount of rotation between said retraction controlling member and said casing, a follower having a cam surface engaging said movable braking element, and a torsion spring having one end anchored to said retraction controlling member and its other end to said follower and having a tendency to rotate said follower and maintain said cam surface in engagement with said movable braking element.

2. In a brake including a movable braking element and a casing formed with an opening adjacent to said movable braking element, mechanism for controlling retraction of said movable braking element into brake released position comprising a retraction controlling member rotatably mounted in said opening in the casing, limiting means providing a predetermined amount of rotation between said retraction controlling member and said casing, a bolt nonrotatably carried by said retraction controlling member, a spring anchorage member nonrotatably carried by said bolt, a cam follower rotatably mounted on said bolt, and a torsion spring having one end anchored to said spring anchorage member and its other end to said cam follower, said cam follower having a cam surface maintained in engagement with said movable braking element by said torsion spring.

3. In a brake including a movable braking element and a casing formed with a circular opening adjacent to said movable braking element, said casing also being formed with an arcuate recess communicating with said opening, mechanism for controlling retraction of said movable braking element into brake released position comprising a retraction controlling member rotatably mounted in said opening and having an ear received in said arcuate recess, said ear and recess providing a predetermined amount of rotation between said retraction controlling member and said casing, a cam follower having a cam surface engaging said movable braking element, and a torsion spring having one end anchored to said traction controlling member and its other end to said follower and normally maintaining said engagement of said cam surface with said movable braking element.

4. In a brake including a movable braking element and a casing formed with a circular opening adjacent to said movable braking element, said casing also being formed with an arcuate recess communicating with said opening, mechanism for controlling retraction of said movable braking element into brake released position comprising a retraction controlling member rotatably mounted in said opening in said casing and having an ear received in said arcuate recess, said retraction controlling member being formed with a noncircular opening, a bolt having a part the cross section of which is complemental to said noncircular opening and which is received in said noncircular opening, a spring anchorage member drivably carried by said bolt, a cam follower rotatably mounted on said bolt and having a cam surface engaging said movable braking element, and a torsion spring having one end anchored to said spring anchorage member and its other end anchored to said cam follower, said spring maintaining said engagement of said cam surface with said movable braking element.

ARNOLD EDWARD LUDWIG.